Patented Mar. 10, 1931

1,796,027

UNITED STATES PATENT OFFICE

HENRI ISCOVESCO, OF PARIS, FRANCE, ASSIGNOR TO HEALTH PRODUCTS CORPORATION, OF NEWARK, NEW JERSEY, A CORPORATION OF NEW JERSEY

PROCESS OF ISOLATING ACTIVE LIPOIDS

No Drawing. Application filed February 26, 1924, Serial No. 695,377. Renewed May 10, 1930.

The present invention relates to a new class of lipoid bodies and to a process of isolating the same. These new lipoids are isolated from particular glands or organs, of animals in healthy condition, and the lipoid from a particular gland or organ has the property, when introduced into the circulation of man (or other living animal) of being taken up by the corresponding gland or organ of the man or animal. Such introduction can be made by hypodermic or other injection or by oral administration, since the juices of the digestive organs are without any deleterious effect thereupon, and the dispersion (solution or suspension or colloidal suspension—solution) thereof can readily be absorbed into the circulation through the walls of the stomach or intestines.

As particular instances of organs which normally carry lipoids of this class, and from which organs the same can readily be obtained, the following may be mentioned: the testes, heart muscle, brain, adrenal cortex, adrenal total, intestine, stomach, ovary, corpus luteum, red corpuscle, mammary gland, thymus, kidney, pancreas, total pituary, placenta, prostate, lung, spleen, thyroid and liver. It is to be understood that this list is given by way of illustration only, and not as limiting the invention thereto. My researches indicate that every organ, gland or functioning element in the body has its own specific active lipoid upon which its normal functional activity depends, and that all of these can be separated from the said organs, etc., of properly selected animals.

As an example of the isolation of a lipoid of the class herein described, I cite the case of a liver lipoid. While the livers of all healthy animals could be employed if desired, or even mixtures of several kinds of livers (e. g. all livers from animals killed in a particular slaughter house) preference is given to the liver of the cod fish. The livers are pressed, and the residue is dried in vacuo in a suitable drying apparatus. The temperature during this step should not go much above 54° C., and the drying should be so conducted that the heating will be continued for, say, 2 to 4 hours. The dried material is thereafter ground or more or less pulverized.

The resulting powder is then preferably extracted with acetone, to remove all, or substantially all, the acetone-soluble matter, which is discarded. This extraction may be performed by a Soxhlet extractor and may occupy 72 hours. This liquid does not contain any of the valuable lipoids of the character referred to in this case, but this liquid extract, as well as any of the other lipoid-free or substantially lipoid-free extracts or solutions referred to herein, can be worked up to recover any other valuable substances contained.

The residue from the acetone extraction is then (dried if desired) and extracted with diethyl ether (sulfuric ether) for say, four hours, and this extract is filtered and saved. This extraction may be conducted in an extractor, or equivalent device.

The residue is next extracted with chloroform, say for three hours, in a Soxhlet apparatus if desired and the chloroform extract can be filtered and is saved.

The residue is then extracted, say for four hours, with cold absolute alcohol, and the alcoholic extract can be filtered if desired, and is saved.

The ether extract is purified by being mixed with four times its volume of acetone and agitated. This precipitates most of the lipoids. The mixture is filtered, the solution is set aside and the precipitate added to the alcoholic extract and the chloroform extract. Ether is added to dissolve the whole of the mixture which is then covered and set aside in a cool dark place for, say 24 hours. By the end of this time it is found that the ethereal solution contains a more or less abundant precipitate which is removed by filtration or decantation. The ether solution, containing the lipoids, is concentrated to a thick consistency, and the solution is then again precipitated by addition of four volumes of acetone. The precipitate is separated by filtration and this is the lipoid in a somewhat crude state, and this lipoid is the active principle of the liver.

This crude product can be purified by washing with acetone, dissolving in ether, alcohol and chloroform, and reprecipitating with acetone, along the lines above outlined, and this purification can be repeated several times, to get the material sufficiently pure. Three or more of such purifications gives a product sufficiently pure for oral administration, but it should be repeated one or more additional times if it is desired to employ the lipoid dissolved in oil, for hypodermic injection. It is important to note that while the active lipoids are somewhat soluble in oils, they are not in solution in the oil in the cod liver, and are not removed, to any large extent from the cod liver by the step of pressing out the oil. However, cod liver oil contains a trace of the active lipoids but the quantity therein is variable, and extremely small.

In place of the cod liver above referred to, other livers can be conveniently used, e. g. the livers of other fishes, skate, turbot, etc., cattle, pigs, sheep and others.

The other glands and organs referred to above can be treated in the same manner as the livers, to produce their respective active lipoids, each of which is characteristic of the gland or organ of its origin.

It will be understood that the above described example of the process is purely illustrative of a suitable procedure for extracting and purifying these lipoids, and a considerable number of other and different solvents and non-solvents or precipitants can be employed, and the present invention is not restricted to the specific methods given herein, but applies to the product lipoids, from whatever source and by whatever process obtained.

To sharply distinguish the active lipoids of the present invention from inactive lipoids, it is stated that the residue of the extracted dried liver can be further extracted with hot absolute alcohol, precipitating with acetone, dissolving again in petroleum ether, precipitating therefrom by acetone, redissolving in hot absolute alcohol. This hot-absolute-alcohol-soluble product, while a lipoid, is however not an active one and hence forms no part of the subject matter claimed herein.

The active lipoids of the present case are, chemically considered, different from fats, in that their molecule is materially larger and they always contain at least four elements, C, H, N, and P and usually contains at least five elements, C, H, O, N, and P.

These active lipoids seem to be, chemically, diamino-phosphatids. As distinguished from the inactive lipoids they are adipoids.

Chemical analysis is not a satisfactory way of defining these active lipoids, but a number of chemical analyses of the active liver lipoids has given the following results, (three samples A, B, and D):

|   | A | B | D |
|---|---|---|---|
| C | 59.93 | 60.12 | 62.03 |
| H | 7.11 | 7.34 | 7.79 |
| N | 2.12 | 2.24 | 2.03 |
| P | 3.93 | 3.98 | 3.98 |

As a comparison with the above, some samples of the inactive lipoids extracted from the residue, as above described were analyzed, giving the following results (three samples E, F, and G):

|   | E | F | G |
|---|---|---|---|
| C | 42.15 | 41.92 | 42.38 |
| H | 9.21 | 9.40 | 10.05 |
| N | 3.14 | 2.88 | 2.97 |
| P | 2.52 | 2.33 | 2.67 |

The active lipoids, whether produced from cod livers by the method above described, or from other organs, are dark brown in color, of a pasty consistency somewhat resembling that of prune pulp, and melt at about 58 to 62° C. If heated too much above their melting point, in air, for some time they will oxidize, and become useless for medicinal purposes. Out of contact with air, as in an inert atmosphere of nitrogen, they can be heated to a high temperature, even considerably above the boiling point of water, without suffering any apparent change. They are, as above stated, insoluble in acetone, but readily soluble in pure alcohol, chloroform, ether and in petroleum ether, carbon bisulfid, and benzol, moderately soluble in olive oil and similar liquid fatty oils. The lipoids are not soluble in water, dilute alkali solutions, dilute acid solutions nor dilute salt solutions, but they form emulsions therein, which emulsions are of a character somewhat approaching colloidal suspensions. Active lipoids are soluble in absolute alcohol, either hot or cold. The lipoids from the different organs do not (in pure state) seem to differ very much from each other as to chemical composition or chemical or physical properties, but they may be very readily distinguished from each other by their physiological properties, since each of the active lipoids is active as to the organs of the kind from which it has been produced. Another important property of the active lipoids is that they seem to exercise functions heretofore attributed to vitamins. Thus the active liver lipoid seems to exercise all of the functions of the antirichitic vitamins. The lipoids have been shown to be readily absorbed by the digestive tract, and to be thereby passed into the circulation, without undergoing any change whatsoever.

The active lipoids appear to function in the organ as the active agent therein or the agent which gives the said organ its power to exercise its normal function in the living body. These do not act solely as excitants or stimulants, of the organ in question, but appear when absorbed by said organ to become an active part of said organ. The lipoids might be said to be to the organs, what the alkaloids are to the plants that produce them, i. e., the characteristic active principle of each organ.

The principle of medication with these active lipoids is accordingly, to add to the system (either orally or hypodermically), the characteristic lipoid corresponding to that organ which is not properly functioning (or the characteristic lipoids of the group of such organs) whereby said organ becomes enriched in its own characteristic lipoid and hence becomes able to function normally, in the system. If an organ in the living body which is not diseased, but only deficient in that it is not functioning properly, it is in many cases due to a lack of a sufficient amount of its characteristic lipoid. If this lipoid is then administered, it is absorbed by said organ, whch then can function normally.

An important point consists in the fact that the lipoids are entirely non-toxic. If an unnecessarily large quantity is administered, over the amount required for the specific organ, then that excess could do no possible harm, but would simply act as an excess of any other non-toxic food material, and would stay in the circulation for a time, and then be discharged through the normal channels.

According to the present invention, the organ which is deficient or functionally weak, is fed directly with its characteristic lipoid, whereby said organ grows healthy and develops and grows into a normal and fully functioning organ. It is characteristic of administering these active lipoids, that the organ of the patient (or animal under treatment in a test) grows and develops much faster than when the said lipoid is not fed at all or is fed only in an insufficient amount. This has been demonstrated in hundreds of tests made on animals.

When the lipoids are to be administered, the oral method (e. g. as pills, tablets or capsules, of known lipoid content, say 5 centigrams) is usually preferable. However, if desired the lipoid can be dissolved in an oil (say 2 centigrams of the lipoid in 1 c. c. of olive oil) and this solution sterilized by heating, and administered hypodermically, or intravenously. An additional mode of administering the lipoids is that of intimately mixing the same with the food of the patent, or with some particular portion thereof. Thus they could be mixed with a fatty material, say butter, which is to be eaten without being cooked.

While I have above referred to the administration of a single lipoid to treat a single organ, it is of course frequently advisable to administer simultaneously a group of two or more lipoids, each of which affects its organ of origin.

In the appended claims, the "organ" is used in its broader sense to include any particular functioning element in the living body, as hereinabove described.

It will be understood that the active lipoids can be kept in solid form, or in solution (e. g. in a sterilized fatty oil) or in the state of pills (if desired with an excipient or with an inert filler, or both) and the claims are intended to cover any and all such forms.

I claim:

1. The method of preparing lipoids which comprises treating with acetone the ether, chloroform and alcohol solutions obtained by treating dry pulverized organs in which such lipoids were originally produced, to cause a precipitation of lipoid-containing material, filtering to separate the said precipitate from the solution, and treating the precipitate successively with cold absolute alcohol, ether and chloroform.

2. The method of preparing lipoids which comprises treating with acetone the ether, chloroform and alcohol solutions obtained by treating dry pulverized liver, to cause a precipitation of lipoid-containing material, filtering to separate the said precipitate from the solution, and treating the precipitate successively with ether, chloroform and cold absolute alcohol in the order named.

3. The method of preparing lipoids which comprises treating dry pulverized liver with acetone to remove matter soluble therein, but to leave the lipoids substantially undissolved, filtering, and treating the residue successively with ether, chloroform and cold absolute alcohol in the order named, shaking the ether extract with four volumes of acetone, adding the precipitate to the alcohol and chloroform extracts, adding ether, cooling, filtering, and shaking the filtrate with acetone.

4. A process of extracting active lipoids from cod livers which comprises first treating the livers with acetone, then extracting the residue with ether, extracting the new residue with chloroform, and extracting the new residue thus obtained with absolute alcohol, and then recovering the lipoids from the ether, alcohol and chloroform extracts.

In testimony whereof I affix my signature.

HENRI ISCOVESCO.